(12) United States Patent
Luo

(10) Patent No.: US 12,238,167 B2
(45) Date of Patent: Feb. 25, 2025

(54) SYNCHRONIZATION METHOD AND ELECTRONIC DEVICE

(71) Applicant: VIVO MOBILE COMMUNICATION CO., LTD., Dongguan (CN)

(72) Inventor: Jie Luo, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 11 days.

(21) Appl. No.: 17/752,830

(22) Filed: May 24, 2022

(65) Prior Publication Data

US 2022/0286503 A1 Sep. 8, 2022

Related U.S. Application Data

(63) Continuation of application No. PCT/CN2020/131029, filed on Nov. 24, 2020.

(30) Foreign Application Priority Data

Nov. 29, 2019 (CN) .......................... 201911200788.X

(51) Int. Cl.
*H04L 67/1095* (2022.01)
*G06F 9/451* (2018.01)
*H04W 4/80* (2018.01)

(52) U.S. Cl.
CPC .......... *H04L 67/1095* (2013.01); *G06F 9/452* (2018.02); *H04W 4/80* (2018.02)

(58) Field of Classification Search
None
See application file for complete search history.

(56) References Cited

U.S. PATENT DOCUMENTS

| 8,451,994 | B2 * | 5/2013 | Abuan | ................... | H04N 23/90 |
| | | | | | 379/102.01 |
| 8,613,070 | B1 * | 12/2013 | Borzycki | .............. | H04L 67/104 |
| | | | | | 726/8 |
| 11,243,653 | B2 * | 2/2022 | Sun | ........................ | G09G 5/14 |

(Continued)

FOREIGN PATENT DOCUMENTS

CN 102298537 A 12/2011
CN 103064696 A 4/2013

(Continued)

OTHER PUBLICATIONS

Extended European Search Report issued in related European Application No. 20894860.4, mailed Dec. 6, 2022, 8 pages.
International Search Report issued in corresponding International Application No. PCT/CN2020/131029, mailed Feb. 7, 2021, 4 pages.

(Continued)

*Primary Examiner* — Backhean Tiv
(74) *Attorney, Agent, or Firm* — IPX PLLC

(57) ABSTRACT

A synchronization method and an electronic device are provided. The synchronization method includes receiving, in a case that a first electronic device is in communication connection with a second electronic device, a running interface of a first application sent by the second electronic device. The synchronization method further includes receiving, in a case that the first electronic device runs the first application, target application data of the first application sent by the second electronic device. The synchronization method also includes synchronizing the target application data to the first application run on the first electronic device.

17 Claims, 4 Drawing Sheets

(56) References Cited

U.S. PATENT DOCUMENTS

| | | | |
|---|---|---|---|
| 11,442,510 B2* | 9/2022 | Li | G06F 1/1677 |
| 11,604,567 B2* | 3/2023 | Zhou | G06F 3/1423 |
| 11,625,164 B2* | 4/2023 | Li | G06F 3/0487 |
| | | | 345/173 |
| 12,081,615 B2* | 9/2024 | Qi | H04L 67/025 |
| 12,095,858 B2* | 9/2024 | Qi | H04W 4/80 |
| 12,135,864 B2* | 11/2024 | Zhang | G06F 3/0484 |
| 2003/0135541 A1* | 7/2003 | Maeda | H04L 67/1095 |
| | | | 709/248 |
| 2009/0213032 A1* | 8/2009 | Newport | G06F 1/1626 |
| | | | 345/1.1 |
| 2013/0147702 A1* | 6/2013 | Aaltonen | G06F 3/1423 |
| | | | 340/4.31 |
| 2014/0012999 A1* | 1/2014 | Chang | H04L 12/1407 |
| | | | 709/228 |
| 2015/0061970 A1* | 3/2015 | Kim | G06F 3/1423 |
| | | | 345/2.3 |
| 2019/0068661 A1* | 2/2019 | Masi | G06F 3/1454 |
| 2019/0317878 A1 | 10/2019 | Ekambaram et al. | |
| 2020/0057596 A1* | 2/2020 | Kim | G06F 3/0482 |
| 2021/0064191 A1* | 3/2021 | Liao | G06F 3/1454 |

FOREIGN PATENT DOCUMENTS

| | | |
|---|---|---|
| CN | 105630587 A | 6/2016 |
| CN | 107659712 A | 2/2018 |
| CN | 107870754 A | 4/2018 |
| CN | 108513008 A | 9/2018 |
| CN | 109660842 A | 4/2019 |
| CN | 111031108 A | 4/2020 |
| JP | 2012108658 A | 6/2012 |
| WO | 2013097898 A1 | 7/2013 |

OTHER PUBLICATIONS

First Office Action issued in related Chinese Application No. 201911200788.X, mailed Feb. 10, 2021, 8 pages.
Second Office Action issued in related Chinese Application No. 201911200788.X, mailed Jun. 3, 2021, 5 pages.
Notice of Reasons for Refusal issued in related Japanese Application No. 2022-529480, mailed Jun. 13, 2023, 3 pages.
Office Action issued in related Korean Application No. 10-2022-7021519, mailed Aug. 28, 2023, 4 pages.

* cited by examiner

SYNCHRONIZATION METHOD AND ELECTRONIC DEVICE

CROSS-REFERENCE TO RELATED APPLICATION

This application is a continuation of International Application No. PCT/CN2020/131029, filed on Nov. 24, 2020, which claims priority to Chinese Patent Application No. 201911200788.X, filed on Nov. 29, 2019. The entire contents of each of the above-referenced applications are expressly incorporated herein by reference.

TECHNICAL FIELD

The present disclosure relates to the field of communication technologies, and in particular, to a synchronization method and an electronic device.

BACKGROUND

Currently, an average amount of smart devices possessed by each person has continuously increased. For a user having a plurality of smart devices, in a case that there is a demand for device switching because one of the smart devices is out of power or usage scenarios are changed, the user needs to exit an operation interface of a current device, start an application on a second device, and then enter the operation interface again. There is an interruption period during switch between applications of two devices, and the user needs to perform cumbersome operations on the second device to implement the same operations previously performed on the first device.

SUMMARY

The present disclosure provides a synchronization method and an electronic device.

The Present Disclosure is Implemented as Follows:

According to a first aspect, an embodiment of the present disclosure provides a synchronization method, applicable to a first electronic device, the method including:
  receiving, in a case that the first electronic device is in communication connection with a second electronic device, a running interface of a first application sent by the second electronic device;
  receiving, in a case that the first electronic device runs the first application, target application data of the first application sent by the second electronic device; and
  synchronizing the target application data to the first application run on the first electronic device.

According to a second aspect, an embodiment of the present disclosure further provides a synchronization method, applicable to a second electronic device, the method including:
  sending, in a case that the second electronic device is in communication connection with a first electronic device, a running interface of a first application to the first electronic device; and
  sending target application data of the first application to the first electronic device.

According to a third aspect, an embodiment of the present disclosure provides an electronic device, the electronic device being a first electronic device and including:
  a first receiving module, configured to receive, in a case that the first electronic device is in communication connection with a second electronic device, a running interface of a first application sent by the second electronic device;
  a second receiving module, configured to receive, in a case that the first electronic device runs the first application, target application data of the first application sent by the second electronic device; and
  a first processing module, configured to synchronize the target application data to the first application run on the first electronic device.

According to a fourth aspect, an embodiment of the present disclosure provides an electronic device, the electronic device being a second electronic device and including:
  a first sending module, configured to send, in a case that the second electronic device is in communication connection with a first electronic device, a running interface of a first application to the first electronic device; and
  a second sending module, configured to send target application data of the first application to the first electronic device.

According to a fifth aspect, an embodiment of the present disclosure further provides an electronic device, including a processor, a memory, and a computer program stored in the memory and executable by the processor, the computer program, when executed by the processor, implementing the steps of the synchronization method described above.

According to a sixth aspect, an embodiment of the present disclosure further provides a computer-readable storage medium, storing a computer program, the computer program, when executed by a processor, implementing the steps of the synchronization method described above.

In the embodiments of the present disclosure, when a first electronic device does not start a first application, a running interface of the first application sent by a second electronic device is received, and the running interface sent by the second electronic device is used as a buffer transition during device switching. After the first electronic device starts the first application and synchronizes data of the first application, a user can directly perform operations on a running interface of the synchronized first application, so that the first application is seamlessly switched from the second electronic device to the first electronic device, thereby ensuring a sense of immersion for the user and reducing user operations during device switching.

BRIEF DESCRIPTION OF THE DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings according to such accompanying drawings without creative efforts.

DETAILED DESCRIPTION

The following describes the technical solutions in the embodiments of the present disclosure with reference to the accompanying drawings in the embodiments of the present disclosure. Apparently, the described embodiments are some of the embodiments rather than all of the embodiments of the present disclosure. All other embodiments derived by a person of ordinary skill in the art based on the embodiments of the present disclosure without creative efforts shall fall within the protection scope of the present disclosure.

Figure 1:
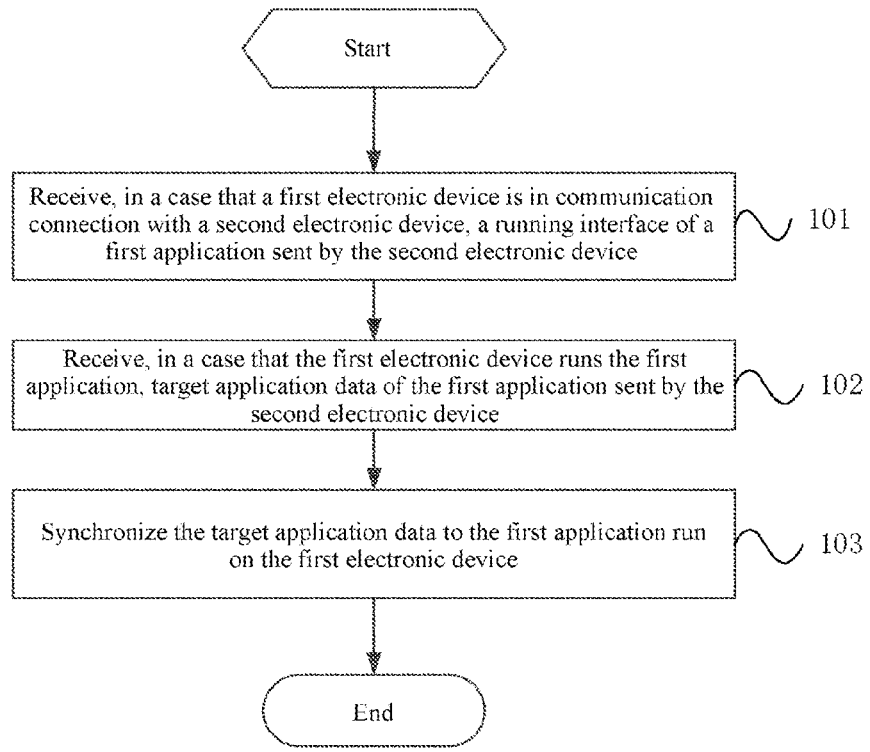
FIG. 1 is a first schematic flowchart of a synchronization method according to an embodiment of the present disclosure.

As shown in FIG. 1, an embodiment of the present disclosure provides a synchronization method, applicable to a first electronic device, the method including:

Step 101: Receive, in a case that the first electronic device is in communication connection with a second electronic device, a running interface of a first application sent by the second electronic device.

In this embodiment, the first application is an application currently run on the second electronic device. When a user uses the first application in the second electronic device, and needs to switch the device, a communication connection between the first electronic device and the second electronic device needs to be first established, to display the running interface of the first application in the second electronic device on the first electronic device in a manner of screen mirroring. In some embodiments, the communication connection between the first electronic device and the second electronic device may be established through Bluetooth, Wi-Fi, and the like. For example, the second electronic device scans the first electronic device through Bluetooth and sends a connection request to the first electronic device.

In some embodiments, both the first electronic device and the second electronic device are configured to be scannable, and the user taps to agree to complete device connection after the connection request sent by the second electronic device is received by the first electronic device. After the communication connection is established, related data of the running interface of the first application sent by the second electronic device can be received by the first electronic device.

Step 102: Receive, in a case that the first electronic device runs the first application, target application data of the first application sent by the second electronic device.

In this embodiment, the target application data is related data of the first application when run on the second electronic device, including path information of jumping to a specific page, a distance between interface sliding positions, account information, a page progress bar of a video or music, rendering data of a game page, and the like. After receiving the running interface of the first application, the first electronic device displays the running interface and wakes up to start the first application. After the first electronic device has woken up and run the first application, the second electronic device further needs to send the target application data to the first electronic device.

In some embodiments, the first electronic device sends an operation data obtaining request to the second electronic device after running the first electronic device; and the second electronic device feeds back the target application data related to the first application to the first electronic device according to the operation data obtaining request.

Step 103: Synchronize the target application data to the first application run on the first electronic device.

The target application data sent by the second electronic device is used for data synchronization. In a case that the first application has been run on the first electronic device, interface rendering is performed on the first application by using the target application data, so that processes of operating the first application run on the first electronic device and the first application run on the second electronic device are synchronized. In some embodiments, after data synchronization and interface rendering are completed, the first electronic device displays a running interface of the first application on the first electronic device on which data is synchronized, rather than displaying the running interface of the first application sent by the second electronic device. It should be noted that, the running interface of the first application on the first electronic device on which data is synchronized is completely the same as the running interface of the first application on the second electronic device, and therefore the user may continue to complete operations for the first application on the first electronic device.

In this embodiment, when the first electronic device does not start the first application, the running interface of the first application sent by the second electronic device is received, the user may perform operations on the received running interface, and the running interface sent by the second electronic device is used as a buffer transition during device switching. After the first electronic device synchronizes data of the first application, the user can directly perform operations on the running interface of the synchronized first application, to switch the first application from the second electronic device to the first electronic device. The switch between the running interface sent by the second electronic device and the running interface of the first application on the first electronic device is performed in a background running state, so that the first application is seamlessly switched from the second electronic device to the first electronic device, thereby ensuring a sense of immersion for the user and reducing user operations during device switching After the switch, the first application is run on the first electronic device and automatically exits from the second electronic device, which can reduce power consumption.

In some embodiments, the first application may be an application currently run in a foreground of the second electronic device, or may be an application run in a background of the second electronic device. In a case that the first application is an application (for example, an instant messaging application or an online shopping application) requiring user login, the user has logged into an account on both the first electronic device and the second electronic device, and the application is kept in a password remembering or automatic login state, the second electronic device does not need to send account information when the first application is switched from the second electronic device to the first electronic device; and in a case that login information of the first application is not recorded on the first electronic device, and the first application is switched from the second electronic device to the first electronic device, the second electronic device needs to send the account information of the user in the first application to the first electronic device, and then the first electronic device starts the first application, logs in to the first application according to the account information, and performs data synchronization on the first application according to operation data.

In some embodiments, step 101 includes: in a case that the first electronic device is in communication connection with the second electronic device, receiving the running interface of the first application sent by the second electronic device and starting the first application on the first electronic device.

In some embodiments, the first electronic device trigger to start the first application according to the received running interface of the first application sent by the second electronic device; or the first electronic device trigger to start the first application according to a user operation performed on the first electronic device.

After receiving the running interface of the first application, the first electronic device wakes up and starts the first application. In some embodiments, in a case that the first application is run in the foreground of the second electronic device, the first electronic device starts the first application and runs the first application in the foreground; and in a case that the first application is run in the background of the second electronic device, the first electronic device starts the first application and runs the first application in the background.

The second electronic device may further simultaneously send data of a plurality of other currently running applications. For example, the first application is an application run in the foreground of the second electronic device, and a second application and a third application are run in the background of the second electronic device. The second electronic device may further send information about the second application and the third application to the first electronic device. When starting the first application, the first electronic device may further start the second application and the third application, and acquire operation data of the second application and the third application from the second electronic device for data synchronization.

In some embodiments, after the receiving a running interface of a first application sent by the second electronic device, the method further includes: displaying the received running interface of the first application on a virtual screen.

After receiving the running interface of the first application, the first electronic device considers that the user needs to display the running interface of the first application of the second electronic device on the first electronic device in the manner of screen mirroring. The first electronic device generates a virtual screen for displaying the running interface according to related data of the running interface of the first application. The virtual screen is a screen to be displayed on the first electronic device in the manner of screen mirroring.

Figure 2:
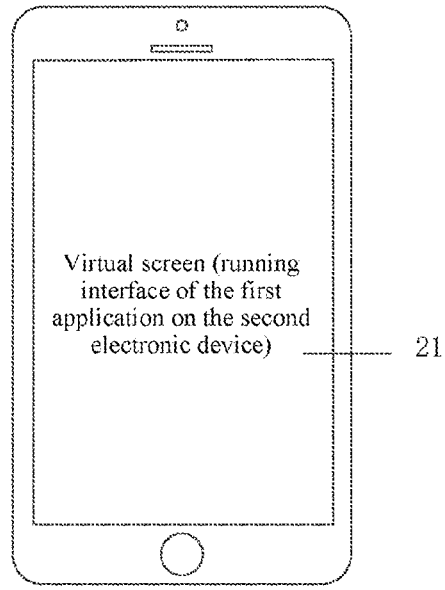
FIG. 2 is a schematic diagram of displaying a virtual screen by a first electronic device according to an embodiment of the present disclosure.

The virtual screen is displayed on a home screen of the first electronic device in an unfolded manner, and covers original content on the screen, thereby displaying the running interface of the first application on the first electronic device in the manner of screen mirroring. The manner of displaying the virtual screen on the first electronic device is shown in FIG. 2, where the virtual screen of the running interface of the first application on the second electronic device is displayed on a display interface 21 of the first electronic device.

In some embodiments, after the displaying the received running interface of the first application on a virtual screen, the method further includes: receiving a first input of the user for the virtual screen; and sending, in response to the first input, operation data corresponding to the first input to the second electronic device.

A screen mirroring connection is kept between the first electronic device and the second electronic device. When the first electronic device displays the virtual screen of the running interface of the first application, operations of the user for the virtual screen on the first electronic device are all first fed back to the second electronic device. For example, the first input represents a forward operation performed by the user on the virtual screen. In this case, after receiving the first input, the first electronic device sends data of the forward operation to the second electronic device, and the second electronic device controls a first interface of the first application to complete the forward operation, and saves related data.

The first electronic device may send the operation data corresponding to the first input to a server when receiving the first input of the user, and the server may forward the operation data to the second electronic device.

In this embodiment, before the first application of the first electronic device is started, the user operation for the first application is performed on the virtual screen, the first electronic device feeds back the operation data to the second electronic device, and the second electronic device performs an operation on the first application according to the operation data. Before the devices are switched, the virtual screen is used as a buffer transition, so that the user can perform operations on the first application without interruption, and the first application run on the second electronic device can be smoothly switched to the first electronic device, thereby ensuring the sense of immersion for the user and reducing user operations during device switching.

In some embodiments, after the synchronizing the target application data to the first application run on the first electronic device, the method further includes:

turning off the virtual screen and displaying the running interface of the first application on a display interface of the first electronic device.

Figure 3:
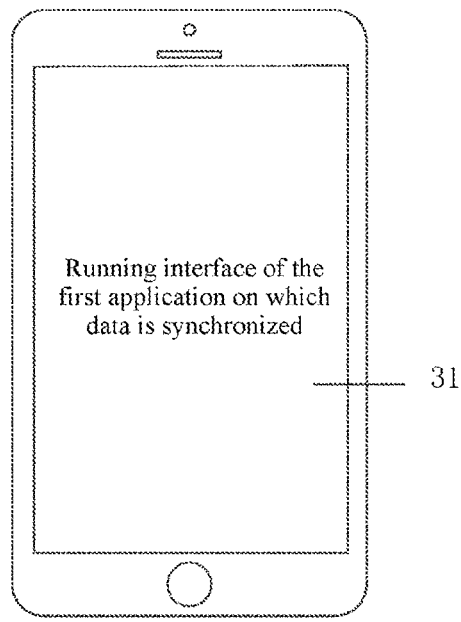
FIG. 3 is a schematic diagram of displaying a running interface of a synchronized first application by a first electronic device according to an embodiment of the present disclosure.

According to the target application data sent by the second electronic device, data synchronization and interface rendering are performed on the first application run on the first electronic device. After data synchronization and interface rendering are completed, the virtual screen is turned off, and the running interface of the first application run on the first electronic device is displayed on a display interface of the first electronic device. The running interface of the first application on the first electronic device on which data is synchronized is completely the same as a display interface of the first application on the second electronic device. As shown in FIG. 3, the running interface of the first application on which data is synchronized is displayed on a display interface 31 of the first electronic device, and in this case, the user may continue to perform an operation on the first application on the running interface of the first application of the first electronic device.

In some embodiments, after the synchronizing the target application data to the first application run on the first electronic device, the method further includes: interrupting the communication connection between the first electronic device and the second electronic device.

After data synchronization and interface rendering are completed, the first electronic device sends a connection interrupting request to the second electronic device, the second electronic device sends a confirmation message, and then the first electronic device interrupts the communication connection with the second electronic device after receiving the confirmation message.

After the communication connection between the first electronic device and the second electronic device is interrupted, the second electronic device stops sending the running interface of the first application to the first electronic device, interrupts a network connection such as Bluetooth/Wi-Fi, and shuts down the first application, thereby switching the first application from the second electronic device to the first electronic device.

In the embodiments of the present disclosure, when the first electronic device does not start the first application, the running interface of the first application sent by the second electronic device is received, the user may perform operations on the received running interface, and the miming interface sent by the second electronic device is used as a buffer transition during device switching After the first electronic device synchronizes data of the first application, the user can directly perform operations on the running interface of the synchronized first application, so that the first application is seamlessly switched from the second electronic device to the first electronic device, thereby ensuring the sense of immersion for the user and reducing user operations during device switching. After the switch, the first application is run on the first electronic device and automatically exits from the second electronic device, which can reduce power consumption.

Figure 4:
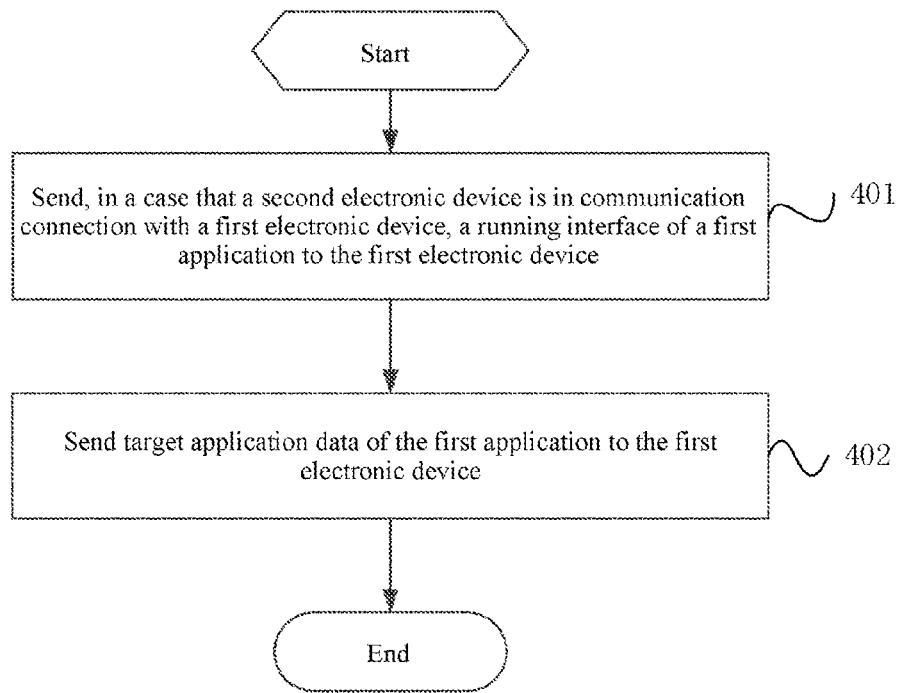
FIG. 4 is a second schematic flowchart of a synchronization method according to an embodiment of the present disclosure.

As shown in FIG. 4, an embodiment of the present disclosure provides a synchronization method, applicable to a second electronic device, the method including:

Step 401: Send, in a case that the second electronic device is in communication connection with a first electronic device, a running interface of a first application to the first electronic device.

In a case that an application is used by the user in the second electronic device, and the second electronic device needs to be switched due to insufficient power or other display requirements, a communication connection with the to-be-switched first electronic device needs to be established, to display a current display interface of the second electronic device on the first electronic device in a manner screen mirroring. In some embodiments, the communication connection between the first electronic device and the second electronic device may be established through Bluetooth, Wi-Fi, and the like. For example, the second electronic device scans the first electronic device through Bluetooth and sends a connection request to the first electronic device. After the communication connection with the first electronic device is established, the running interface of the first application is sent to the first electronic device through the communication connection.

Step 402: Send target application data of the first application to the first electronic device.

The target application data is related data of the first application when run on the second electronic device, including path information of jumping to a specific page, a distance between interface sliding positions, account information, a page progress bar of a video or music, rendering data of a game page, and the like. The second electronic device may send the target application data related to the first application to the first electronic device according to an operation data obtaining request sent by the first electronic device, so that the first electronic device may perform data synchronization and interface rendering.

In this embodiment, in a case that the user needs to switch the application from the second electronic device to the first electronic device, the communication connection with the first electronic device is first established, and the running interface of the first application is sent to the first electronic device, so that the first electronic device displays the running interface of the first application. The running interface sent by the second electronic device is used as a buffer transition during device switching. The second electronic device sends the target application data of the first application to the first electronic device, so that the first electronic device synchronizes data of the first application, and the first application is seamlessly switched from the second electronic device to the first electronic device, thereby ensuring the sense of immersion for the user and reducing user operations during device switching After the switch, the first application is run on the first electronic device and the second electronic device automatically exits miming of the first application, which can reduce power consumption.

In some embodiments, In a case that the first application is an application (for example, an instant messaging application or an online shopping application) requiring user login, the user has logged into an account on both the first electronic device and the second electronic device, and the application is kept in a password remembering or automatic login state, the second electronic device does not need to send account information when the first application is switched from the second electronic device to the first electronic device; and in a case that login information of the first application is not recorded on the first electronic device, and the first application is switched from the second electronic device to the first electronic device, the second electronic device needs to send the account information of the user in the first application to the first electronic device.

In some embodiments, before the communication connection is established between the second electronic device and the first electronic device, the method further includes:
  receiving a second input of the user for the running interface of the first application; and displaying an application selection interface in response to the second input, the application selection interface including an icon of the first application.

The second input is a wake-up input for a device switching function, and a form of the second input may be set according to requirements. For example, the second input may be an input of the user by touching and holding the screen with two fingers or may be an input of the user by operating a physical key. The first interface is a current display interface of the first application on the second electronic device. The user wakes up the device switching function on the first interface, and the application selection interface is then displayed on a part of the first interface or the entire first interface. The application selection interface may be in the form of a window or may completely cover the first interface.

The application selection interface includes icons of all applications supporting screen mirroring and currently run in the foreground and the background of the second electronic device, for the user to select an application for screen mirroring. The first application may be an application currently run in the foreground, and the user then selects the icon of the first application on the application selection interface. After establishing the communication connection with the first electronic device, the second electronic device sends the running interface of the first application to the first electronic device.

In some embodiments, the application selection interface further includes: an icon of another application run on the second electronic device other than the first application. In a case that the user intends to synchronously switch a plurality of applications run in the background of the second electronic device to the first electronic device, icons of the applications that the user intends to synchronously switch may be selected on the application selection interface. After establishing the communication connection with the first electronic device, the second electronic device sends application data of another application selected to the first electronic device.

Figure 5:
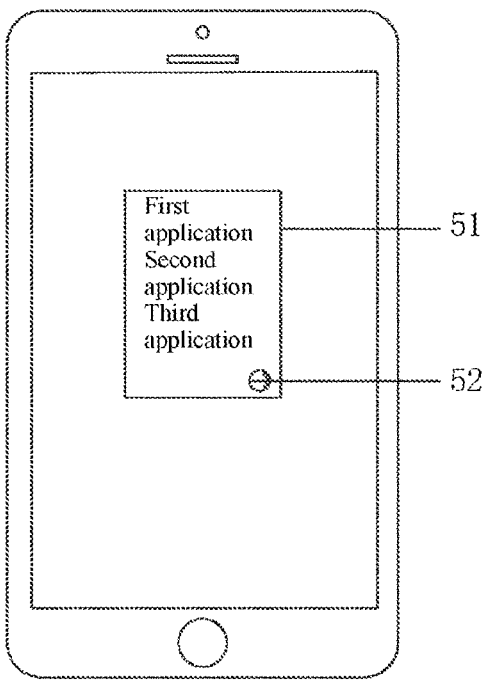
FIG. 5 is a schematic diagram of an application selection interface according to an embodiment of the present disclosure.
Figure 6:
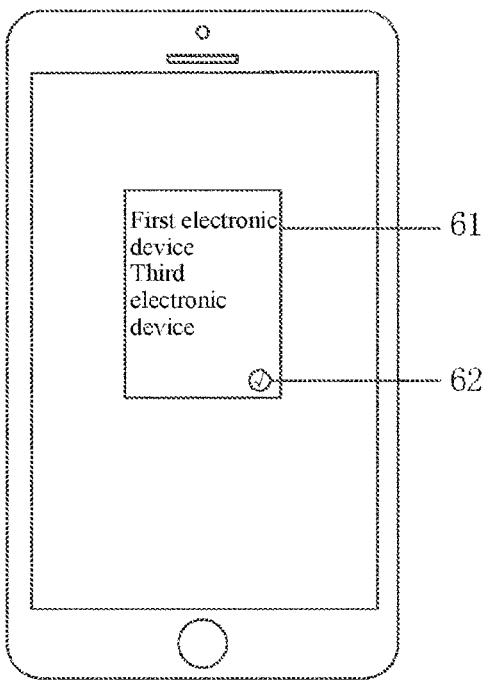
FIG. 6 is a schematic diagram of a selection window of a to-be-switched device according to an embodiment of the present disclosure.

Taking an example in which applications currently run on the second electronic device include a first application, a second application, and a third application, as shown in FIG. 5, the user may freely select applications to be synchronously switched in an application selection interface 51 and tap an arrow button 52 indicating a next step after the selection, and then a selection window 61 of a to-be-switched device pops up. As shown in FIG. 6, the selection window 61 includes a first electronic device and a third electronic device. The user selects a to-be-switched device according to requirements, and taps a confirm button 62 after the selection. The second electronic device then sends a communication connection request to an electronic device selected by the user to establish a communication connection.

In some embodiments, the method further includes:
receiving operation data sent by the first electronic device, the operation data being operation data corresponding to the first input performed by the user on the virtual screen of the first electronic device; and updating the first interface according to the operation data.

In this embodiment, when the communication connection is kept between the first electronic device and the second electronic device, and the first electronic device displays the running interface of the first application on the virtual screen, operations performed by the user on the virtual screen on the first electronic device are first fed back to the second electronic device. After receiving the operation data of the user for the virtual screen, the second electronic device controls, according to the operation data, the currently displayed first interface of the first application to complete corresponding operations, and saves related data. The second electronic device then sends target application data of the first application to the first electronic device, and sends data corresponding to the updated interface to the first electronic device.

In this embodiment, before the first application of the first electronic device is started, the user operation for the first application is performed on the virtual screen, the first electronic device feeds back the operation data to the second electronic device, and the second electronic device perform an operation on the first application according to the operation data. Before the devices are switched, the virtual screen is used as a buffer transition, so that the user can perform operations on the first application without interruption, and the first application run on the second electronic device can be smoothly switched to the first electronic device, thereby ensuring the sense of immersion for the user and reducing user operations during device switching.

In some embodiments, after the sending target application data of the first application to the first electronic device, the method further includes:
interrupting the communication connection between the second electronic device and the first electronic device; and in a case that the communication connection between the second electronic device and the first electronic device is interrupted, stopping sending the miming interface of the first application and shutting down the first application.

In this embodiment, after performing data synchronization and interface rendering, the first electronic device sends a connection interrupting request to the second electronic device, the second electronic device sends a confirmation message to the first electronic device according to the connection interrupting request, and then the first electronic device interrupts the communication connection after confirming that data synchronization is completed. In this way, it is ensured that a display interface of the first electronic device on the first electronic device on which data is synchronized is completely the same as a display interface of the first application on the second electronic device, thereby seamlessly switching applications between different electronic devices.

A specific implementation process in which the first application is switched from the second electronic device to the first electronic device is described below.

Taking an example in which the second electronic device currently displays a running interface of the first application, and the user touches and holds the running interface with two fingers to wake up a device switching function, the user touches and holds the running interface of the first application displayed on the second electronic device with two fingers to wake up the device switching function; an application selection interface pops up, the application selection interface including icons of applications currently run on the second electronic device; the user selects an icon of the first application; the user selects a to-be-switched first electronic device and establishes a communication connection; the second electronic device sends the running interface of the first application to the first electronic device; the first electronic device displays a virtual screen of the running interface of the first application in a manner of screen mirroring, and feeds back operation data of the user on the virtual screen to the second electronic device; the first electronic device wakes up and starts the first application in a background, and acquires target application data of the first application from the second electronic device; the first electronic device completes data synchronization and interface rendering of the first application according to the target application data; after completing the data synchronization and the interface rendering, the first electronic device interrupts the communication connection with the second electronic device and turns off the virtual screen; and the second electronic device stops sending the running interface of the first application, thereby switching the first application from the second electronic device to the first electronic device.

In the embodiments of the present disclosure, in a case that the user needs to switch the application from the second electronic device to the first electronic device, the communication connection with the first electronic device is first established, and the running interface of the first application is sent to the first electronic device, so that the first electronic device displays the running interface of the first application. The running interface sent by the second electronic device is used as a buffer transition during device switching. The second electronic device sends the target application data of the first application to the first electronic device, so that the first electronic device synchronizes data of the first application, and the same batch of applications can be seamlessly switched between two devices, thereby ensuring the sense of immersion for the user and reducing user operations during device switching After the switch, the first application is run on the first electronic device and the second electronic device automatically exits running of the first application, which can reduce power consumption.

Figure 7:
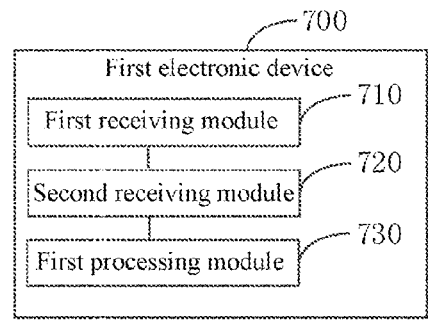
FIG. 7 is a schematic structural diagram of modules of a first electronic device according to an embodiment of the present disclosure.

As shown in FIG. 7, an embodiment of the present disclosure further provides an electronic device, the electronic device being a first electronic device 700 and including:

a first receiving module 710, configured to receive, in a case that the first electronic device is in communication connection with a second electronic device, a running interface of a first application sent by the second electronic device;

a second receiving module 720, configured to receive, in a case that the first electronic device runs the first application, target application data of the first application sent by the second electronic device; and a first processing module 730, configured to synchronize the target application data to the first application run on the first electronic device.

In some embodiments, the first receiving module is further configured to:

in a case that the first electronic device is in communication connection with the second electronic device, receive the running interface of the first application sent by the second electronic device and start the first application on the first electronic device.

In some embodiments, the electronic device further includes:

a first display module, configured to display the received running interface of the first application on a virtual screen.

In some embodiments, the electronic device further includes:

a second processing module, configured to turn off the virtual screen and display the running interface of the first application on a display interface of the first electronic device.

In some embodiments, the electronic device further includes:

a third processing module, configured to interrupt the communication connection between the first electronic device and the second electronic device.

The electronic device according to this embodiment of the present disclosure can implement all processes implemented by the electronic device described in the method embodiments shown in FIG. 1 to FIG. 3, details of which are omitted herein for brevity.

In the embodiments of the present disclosure, when the first electronic device does not start the first application, the running interface of the first application sent by the second electronic device is received, the user may perform operations on the received running interface, and the miming interface sent by the second electronic device is used as a buffer transition during device switching After the first electronic device synchronizes data of the first application, the user can directly perform operations on the running interface of the synchronized first application, so that the first application is seamlessly switched from the second electronic device to the first electronic device, thereby ensuring the sense of immersion for the user and reducing user operations during device switching. After the switch, the first application is run on the first electronic device and automatically exits from the second electronic device, which can reduce power consumption.

Figure 8:
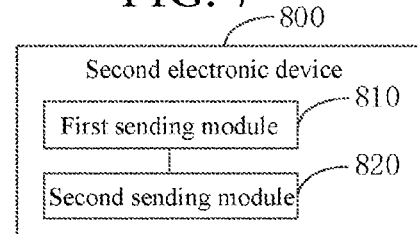
FIG. 8 is a schematic structural diagram of modules of a second electronic device according to an embodiment of the present disclosure.

As shown in FIG. 8, an embodiment of the present disclosure further provides an electronic device, the electronic device being a second electronic device 800 and including:

a first sending module 810, configured to send, in a case that the second electronic device is in communication connection with a first electronic device, a running interface of a first application to the first electronic device; and a second sending module 820, configured to send target application data of the first application to the first electronic device.

In some embodiments, the electronic device further includes:

a fourth electronic device processing module, configured to interrupt the communication connection between the second electronic device and the first electronic device; and a fifth processing module, configured to: in a case that the communication connection between the second electronic device and the first electronic device is interrupted, stop sending the running interface of the first application and shut down the first application.

The electronic device according to this embodiment of the present disclosure can implement all processes implemented by the electronic device described in the method embodiments shown in FIG. 4 to FIG. 6, details of which are omitted herein for brevity.

In the embodiments of the present disclosure, in a case that the user needs to switch the application from the second electronic device to the first electronic device, the communication connection with the first electronic device is first established, and the running interface of the first application is sent to the first electronic device, so that the first electronic device displays the running interface of the first application. The running interface sent by the second electronic device is used as a buffer transition during device switching. The second electronic device sends the target application data of the first application to the first electronic device, so that the first electronic device synchronizes data of the first application, and the same batch of applications can be seamlessly switched between two devices, thereby ensuring the sense of immersion for the user and reducing user operations during device switching After the switch, the first application is run on the first electronic device and the second electronic device automatically exits running of the first application, which can reduce power consumption.

Figure 9:
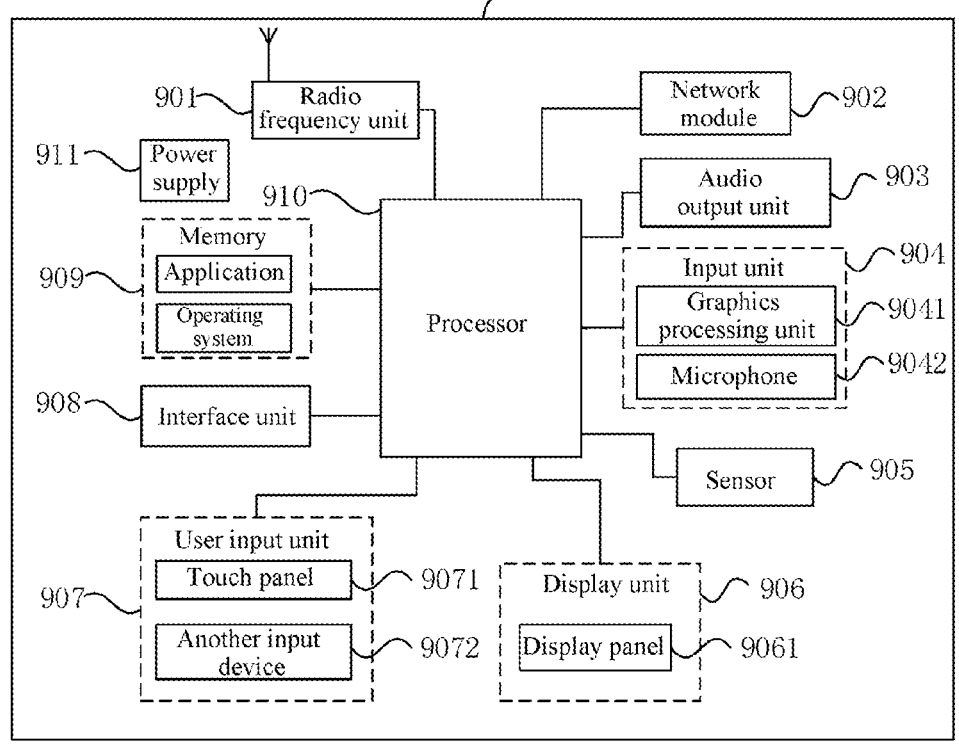
FIG. 9 is a schematic structural diagram of hardware of an electronic device according to an embodiment of the present disclosure.

FIG. 9 is a schematic diagram of a hardware structure of an electronic device that implements the embodiments of the present disclosure.

The electronic device 900 includes, but is not limited to, components such as a radio frequency unit 901, a network module 902, an audio output unit 903, an input unit 904, a sensor 905, a display unit 906, a user input unit 907, an interface unit 908, a memory 909, a processor 910, and a power supply 911. A person skilled in the art may understand that the structure of the electronic device shown in FIG. 9 constitutes no limitation on the electronic device, and the electronic device may include more or fewer components than those shown in the figure, or some components may be combined, or a different component deployment may be used. In the embodiments of the present disclosure, the electronic device includes, but is not limited to, a mobile phone, a tablet computer, a notebook computer, a palmtop computer, an in-vehicle terminal, a wearable device, a pedometer, and the like.

When the electronic device is a first electronic device, the processor 910 is configured to receive, in a case that the first electronic device is in communication connection with a second electronic device, a running interface of a first application sent by the second electronic device;

receive, in a case that the first electronic device runs the first application, target application data of the first application sent by the second electronic device; and synchronize the target application data to the first application run on the first electronic device.

When the electronic device is a second electronic device, the processor 910 is configured to send, in a case that the second electronic device is in communication connection with a first electronic device, a running interface of a first application to the first electronic device; and send target application data of the first application to the first electronic device.

In the embodiments of the present disclosure, when the first electronic device does not start the first application, the running interface of the first application sent by the second electronic device is received, the user may perform operations on the received running interface, and the miming interface sent by the second electronic device is used as a buffer transition during device switching After the first electronic device synchronizes data of the first application, the user can directly perform operations on the running interface of the synchronized first application, so that the first application is seamlessly switched from the second electronic device to the first electronic device, thereby ensuring the sense of immersion for the user and reducing user operations during device switching. After the switch, the first application is run on the first electronic device and automatically exits from the second electronic device, which can reduce power consumption.

It is to be understood that, in this embodiment of the present disclosure, the radio frequency unit 901 may be configured to transmit and receive information or transmit and receive signals during a call. Specifically, the radio frequency unit 901 is configured to receive downlink data from a base station and transmit downlink data to the processor 910 for processing; and send uplink data to the base station. Generally, the radio frequency unit 901 includes, but is not limited to, an antenna, at least one amplifier, a transceiver, a coupler, a low noise amplifier, a duplexer, and the like. In addition, the radio frequency unit 901 may further communicate with another device through a wireless communication system and a network.

The electronic device provides wireless broadband Internet access for a user by using the network module 902, for example, allowing the user to send and receive emails, browse webpages, access streaming media content, and the like.

The audio output unit 903 may convert audio data received by the radio frequency unit 901 or the network module 902 or stored on the memory 909 into audio signals and output the audio signals as sounds. In addition, the audio output unit 903 may further provide audio output related to specific functions implemented by the electronic device 900 (for example, a call signal receiving sound and a message receiving sound). The audio output unit 903 includes a speaker, a buzzer, a receiver, and the like The input unit 904 is configured to receive an audio or video signal. The input unit 904 may include a Graphics Processing Unit (GPU) 9041 and a microphone 9042. The graphics processing unit 9041 performs processing on image data of a static picture or a video acquired by an image acquisition device (for example, a camera) in a video acquisition mode or an image acquisition mode. The processed image frame can be displayed on the display unit 906. An image frame processed by the graphics processing unit 9041 may be stored in the memory 909 (or another storage medium) or sent by using the radio frequency unit 901 or the network module 902. The microphone 9042 may receive a sound and can process such a sound into audio data. The processed audio data may be converted, in a phone call mode, into a format that may be sent by the radio frequency unit 901 to a mobile communication base station.

The electronic device 900 further includes at least one sensor 905 such as an optical sensor, a motion sensor, or another sensor. Specifically, the optical sensor includes an ambient light sensor and a proximity sensor. The ambient light sensor may adjust luminance of a display panel 9061 according to brightness of the ambient light. The proximity sensor may switch off the display panel 9061 and/or backlight when the electronic device 900 is moved to the ear. As a type of motion sensor, an accelerometer sensor can detect magnitudes of accelerations in various directions (generally, on three axes), may detect a magnitude and a direction of the gravity when static, and may be applied to recognizing the attitude of the electronic device (for example, switching between landscape orientation and portrait orientation, a related game, and magnetometer attitude calibration), a function related to vibration recognition (for example, a pedometer and a knock), and the like. The sensor 905 may further include a fingerprint sensor, a pressure sensor, an iris sensor, a molecular sensor, a gyroscope, a barometer, a hygrometer, a thermometer, an infrared sensor, and the like, which are not described herein in detail.

The display unit 906 is configured to display information inputted by the user or information provided for the user. The display unit 906 may include a display panel 9061. The display panel 9061 may be configured in the form of a Liquid Crystal Display (LCD), an Organic Light-Emitting Diode (OLED), or the like.

The user input unit 907 may be configured to receive input digit or character information, and generate a keyboard signal input related to the user setting and function control of the electronic device. Specifically, the user input unit 907 includes a touch panel 9071 and another input device 9072. The touch panel 9071, also referred to as a touchscreen, may collect a touch operation of a user on or near the touch panel (for example, an operation of a user on or near the touch panel 9071 by using any suitable object or attachment, such as a finger or a stylus). The touch panel 9071 may include two parts: a touch detection apparatus and a touch controller. The touch detection apparatus detects a touch orientation of the user, detects a signal generated by the touch operation, and transmits the signal to the touch controller. The touch controller receives touch information from the touch detection apparatus, converts the touch information into touch point coordinates, and transmits the touch point coordinates to the processor 910. In addition, the touch controller receives a command transmitted by the processor 910 and executes the command. In addition, the touch panel 9071 may be implemented by using various types, such as a resistive type, a capacitance type, an infrared type, and a surface acoustic wave type. In addition to the touch panel 9071, the user input unit 907 may further include the another input device 9072. Specifically, the another input device 9072 may include, but is not limited to, a physical keyboard, a functional key (for example, a volume control key or a switch key), a track ball, a mouse, and a joystick, and the details will not be described herein again.

Further, the touch panel 9071 may cover the display panel 9061. After detecting a touch operation on or near the touch panel, the touch panel 9071 transfers the touch operation to the processor 910, to determine a type of a touch event. Then, the processor 910 provides a corresponding visual output on the display panel 9061 according to the type of the touch event. In FIG. 9, the touch panel 9071 and the display panel 9061 implement, as two independent parts, input and output functions of the electronic device. However, in some embodiments, the touch panel 9071 and the display panel 9061 may be integrated to implement the input and output functions of the electronic device. The details are not limited herein.

The interface unit 908 is an interface for connecting an external apparatus and the electronic device 900. For example, the external apparatus may include a wired or wireless headset port, an external power supply (or a battery charger) port, a wired or wireless data port, a storage card port, a port used to connect an apparatus having an identification module, an audio input/output (I/O) port, a video I/O port, an earphone port, and the like. The interface unit 908 may be configured to receive input (for example, data information or power) from an external apparatus and transmit the received input to one or more elements in the electronic device 900 or may be configured to transmit data between the electronic device 900 and the external apparatus.

The memory 909 may be configured to store a software program and various data. The memory 909 may mainly include a program storage area and a data storage area. The program storage area may store an operating system, an application required by at least one function (for example, a sound playback function and an image display function), and the like. The data storage area may store data (for example, audio data and a phone book) created according to the use of the mobile phone. In addition, the memory 909 may include a high speed random access memory, and may further include a non-volatile memory, such as at least one magnetic disk storage device, a flash memory, or another non-volatile solid state storage device.

The processor 910 is a control center of the electronic device, and connects to various parts of the electronic device by using various interfaces and lines. By running or executing the software program and/or module stored in the memory 909, and invoking data stored in the memory 909, the processor performs various functions and data processing of the electronic device, thereby performing overall monitoring on the electronic device. The processor 910 may include one or more processing units. For example, the processor 910 may integrate an application processor and a modem processor. The application processor mainly processes an operating system, a user interface, an application, and the like. The modem processor mainly processes wireless communication. It may be understood that the modem processor may alternatively not be integrated into the processor 910.

The electronic device 900 may further include the power supply 911 (for example, a battery) for supplying power to the components. For example, the power supply 911 may be logically connected to the processor 910 by a power management system, thereby implementing functions such as charging, discharging, and power consumption management by using the power management system.

In addition, the electronic device 900 includes some functional module that are not shown, which are not described herein in detail.

For example, an embodiment of the present disclosure further provides an electronic device, including a processor 910, a memory 909, and a computer program stored on the memory 909 and executable on the processor 910, where when executed by the processor 910, the computer program implements the processes of the embodiments of the synchronization method described above, and can achieve the same technical effects. To avoid repetition, details are not described herein again.

An embodiment of the present disclosure further provides a computer-readable storage medium, storing a computer program, where the computer program, when executed by a processor, implements various processes of the embodiments of the processes of the embodiment of the synchronization method described above, and can achieve the same technical effects. To avoid repetition, details are not described herein again. The computer-readable storage medium is, for example, a Read-Only Memory (ROM), a Random Access Memory (RAM), a magnetic disk, or an optical disc.

It should be noted that, the terms "include", "comprise", and any variants thereof are intended to cover a non-exclusive inclusion. Therefore, in the context of a process, method, object, or apparatus that includes a series of elements, the process, method, object, or apparatus not only includes such elements, but also includes other elements not specified expressly, or may include inherent elements of the process, method, object, or apparatus. Without more limitations, elements defined by the sentence "including one" does not exclude that there are still other same elements in the process, method, object, or apparatus.

Through the descriptions of the foregoing implementations, a person skilled in the art may clearly understand that the methods in the foregoing embodiments may be implemented by means of software and a necessary general hardware platform, and certainly, may be alternatively implemented by hardware, but in many cases, the former manner is a better implementation. Based on such an understanding, the technical solutions of the present disclosure or the part that makes contributions to the related art may be substantially embodied in the form of a software product. The computer software product is stored in a storage medium (for example, a ROM/RAM, a magnetic disk, or an optical disc), and contains several instructions for instructing a terminal (which may be a mobile phone, a computer, a server, an air conditioner, or a network device) to perform the method described in the embodiments of the present disclosure.

The embodiments of the present disclosure are described above with reference to the accompanying drawings. However, the present disclosure is not limited to the specific implementations described above, and the specific implementations described above are merely exemplary but not limitative. A person of ordinary skill in the art may make various variations under the teaching of the present disclosure without departing from the spirit of the present disclosure and the protection scope of the claims, and such variations shall all fall within the protection scope of the present disclosure.

What is claimed is:

1. A synchronization method, executed by a first electronic device, the method comprising:

when the first electronic device is in communication connection with a second electronic device and a first application runs on the second electronic device but not on the first electronic device, mirroring a running interface of the first application as it is running on the second electronic device
on a display interface of the first electronic device;
starting to run the first application on the first electronic device itself in a background running state;
after the first application is running on the first electronic device in the background running state, receiving target application data of the first application sent by the second electronic device;
synchronizing the target application data to the first application running on the first electronic device in the background running state; and
displaying the first application that runs on the first electronic device itself on the display interface of the first electronic device to replace the mirrored running interface of the first application running on the second electronic device.

2. The synchronization method according to claim 1, wherein mirroring the running interface of the first application as it is running on the second electronic device on the display interface of the first electronic device further comprises:
displaying the mirrored running interface on a virtual screen of the first electronic device.

3. The synchronization method according to claim 2, wherein after displaying the first application that runs on the first electronic device itself on the display interface of the first electronic device, the method further comprises:
turning off the virtual screen.

4. The synchronization method according to claim 1, wherein after the synchronizing the target application data to the first application running on the first electronic device, the method further comprises:
interrupting the communication connection between the first electronic device and the second electronic device.

5. The synchronization method according to claim 1, wherein after mirroring the running interface of the first application, the method further comprises:
displaying the mirrored running interface on a virtual screen of the first electronic device; and
before the first application of the first electronic device is started, when a user operation for the first application is performed on the virtual screen, the first electronic device feeds back data of the user operation to the second electronic device, and the second electronic device performs an operation on the first application according to the data of the user operation.

6. A synchronization method, executed by a second electronic device, the method comprising:
when the second electronic device is in communication connection with a first electronic device and a first application runs on the second electronic device but not on the first electronic device, sending a running interface of the first application to the first electronic device for mirroring the running interface of the first application as it is running on the second electronic device on a display interface of the first electronic device; and
after the first application is running on the first electronic device in the background running state, sending target application data of the first application to the first electronic device,
wherein:
the target application data is synchronized to the first application running on the first electronic device in the background running state, and the first application that runs on the first electronic device itself displays on the display interface of the first electronic device to replace the mirrored running interface of the first application running on the second electronic device.

7. The synchronization method according to claim 6, wherein after the sending target application data of the first application to the first electronic device, the method further comprises:
interrupting the communication connection between the second electronic device and the first electronic device; and
in a case that the communication connection between the second electronic device and the first electronic device is interrupted, stopping sending the running interface of the first application and shutting down the first application.

8. An electronic device, wherein the electronic device is a first electronic device and comprises:
a memory storing instructions; and
at least one processor coupled to the memory and configured to execute the instructions, wherein the instructions, when executed by the at least one processor, cause the at least one processor to perform operations comprising:
when the first electronic device is in communication connection with a second electronic device and a first application runs on the second electronic device but not on the first electronic device, mirroring a running interface of the first application as it is running on the second electronic device
on a display interface of the first electronic device;
starting to run the first application on the first electronic device itself in a background running state;
after the first application is running on the first electronic device in the background running state, receiving target application data of the first application sent by the second electronic device;
synchronizing the target application data to the first application running on the first electronic device in the background running state; and
displaying the first application that runs on the first electronic device itself on the display interface of the first electronic device to replace the mirrored running interface of the first application running on the second electronic device.

9. The electronic device according to claim 8, wherein mirroring the running interface of the first application as it is running on the second electronic device on the display interface of the first electronic device further comprises:
displaying the mirrored running interface on a virtual screen of the first electronic device.

10. The electronic device according to claim 9, wherein after displaying the first application that runs on the first electronic device itself on the display interface of the first electronic device, the operations further comprise:
turning off the virtual screen.

11. The electronic device according to claim 8, wherein the operations further comprise:
interrupting the communication connection between the first electronic device and the second electronic device.

12. The electronic device according to claim 8, wherein after mirroring the running interface of the first application, the operations further comprise:
displaying the mirrored running interface on a virtual screen of the first electronic device; and before the first application of the first electronic device is started, when a user operation for the first application is performed on the virtual screen, the first electronic device feeds back data of the user operation to the second electronic device, and the second electronic device performs an operation on the first application according to the data of the user operation.

13. A non-transitory computer-readable storage medium storing instructions that, when executed by a processor, cause the processor to perform a synchronization method, the method comprising:
when a first electronic device is in communication connection with a second electronic device and a first application runs on the second electronic device but not on the first electronic device, mirroring a running interface of the first application as it is running on the second electronic device
on a display interface of the first electronic device;
starting to run the first application on the first electronic device itself in a background running state;
after the first application is running on the first electronic device in the background running state, receiving target application data of the first application sent by the second electronic device;
synchronizing the target application data to the first application running on the first electronic device in the background running state; and
displaying the first application that runs on the first electronic device itself on the display interface of the first electronic device to replace the mirrored running interface of the first application running on the second electronic device.

14. The non-transitory computer-readable storage medium according to claim 13, wherein mirroring the running interface of the first application as it is running on the second electronic device on the display interface of the first electronic device further comprises:
displaying the mirrored running interface on a virtual screen of the first electronic device.

15. The non-transitory computer-readable storage medium according to claim 14, wherein after displaying the first application that runs on the first electronic device itself on the display interface of the first electronic device, the method further comprises:
turning off the virtual screen.

16. The non-transitory computer-readable storage medium according to claim 13, wherein after the synchronizing the target application data to the first application running on the first electronic device, the method further comprises:
interrupting the communication connection between the first electronic device and the second electronic device.

17. The non-transitory computer-readable storage medium according to claim 13, wherein after mirroring the running interface of the first application, the method further comprises:
displaying the mirrored running interface on a virtual screen of the first electronic device; and
before the first application of the first electronic device is started, when a user operation for the first application is performed on the virtual screen, the first electronic device feeds back data of the user operation to the second electronic device, and the second electronic device performs an operation on the first application according to the data of the user operation.

* * * * *